(12) United States Patent
Lu et al.

(10) Patent No.: US 7,695,785 B2
(45) Date of Patent: Apr. 13, 2010

(54) COATED ARTICLE WITH OXIDES AND/OR OXYNITRIDES OF ANTIMONY AND/OR ZINC DIELECTRIC LAYER(S) AND CORRESPONDING METHOD

(75) Inventors: Yiwei Lu, Ann Arbor, MI (US); Desaraju V. Varaprasad, Ann Arbor, MI (US); John A. Vanderploeg, Highland, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 830 days.

(21) Appl. No.: 11/486,372

(22) Filed: Jul. 14, 2006

(65) Prior Publication Data

US 2008/0014448 A1 Jan. 17, 2008

(51) Int. Cl.
*E06B 3/00* (2006.01)
*B32B 9/00* (2006.01)
*E04C 2/54* (2006.01)

(52) U.S. Cl. .......................... 428/34; 428/432; 428/698; 428/699; 428/701; 428/702; 52/786.1; 52/786.13; 359/360; 359/361

(58) Field of Classification Search ............... 428/34, 428/432, 433, 698, 699, 701, 702; 52/786.1, 52/786.13; 359/359, 360, 361, 580, 585, 359/586, 589
See application file for complete search history.

(56) References Cited

U.S. PATENT DOCUMENTS

| 4,990,408 | A | 2/1991 | Gillery |
| 5,332,618 | A * | 7/1994 | Austin ................... 428/216 |
| 5,714,268 | A | 2/1998 | Anderson et al. |
| 5,939,201 | A | 8/1999 | Boire et al. |
| 5,965,246 | A | 10/1999 | Guiselin et al. |
| 6,149,888 | A | 11/2000 | Ota et al. |
| 6,632,491 | B1 | 10/2003 | Thomsen et al. |
| 6,686,050 | B2 | 2/2004 | Lingle et al. |
| 6,730,352 | B2 | 5/2004 | Stachowiak |
| 6,749,941 | B2 | 6/2004 | Lingle |
| 6,787,005 | B2 | 9/2004 | Laird et al. |
| 6,797,388 | B1 | 9/2004 | Szanyi et al. |
| 6,802,943 | B2 | 10/2004 | Stachowiak |
| 6,830,817 | B2 | 12/2004 | Stachowiak |
| 6,887,575 | B2 | 5/2005 | Neuman et al. |
| 6,916,408 | B2 | 7/2005 | Laird et al. |

FOREIGN PATENT DOCUMENTS

| DE | 198 48 751 | 12/1999 |
| EP | 1 057 795 | 12/2000 |
| EP | 1 491 503 | 12/2004 |
| JP | 10-194780 | 7/1998 |
| WO | WO 2007/064450 | 6/2007 |

OTHER PUBLICATIONS

International Search Report dated Dec. 17, 2007.

\* cited by examiner

*Primary Examiner*—Donald Loney
(74) *Attorney, Agent, or Firm*—Nixon & Vanderhye, P.C.

(57) ABSTRACT

Certain embodiments of this invention relates to a coated article including a substrate (e.g., glass substrate) which supports a coating thereon, wherein the coating includes at least one layer of or including $SbO_xN_y$. This layer is desirable for blocking (reflection and/or absorption) of at least some ultraviolet (UV) radiation. In certain example embodiments of this invention, the layer of $SbO_xN_y$ may be used as a dielectric layer in a low-E (low-emissivity) coating, and may improve UV-blocking capability of such a low-E coating. Coated articles in certain example embodiments of this invention may be used in the context of windows.

17 Claims, 6 Drawing Sheets

COATED ARTICLE WITH OXIDES AND/OR OXYNITRIDES OF ANTIMONY AND/OR ZINC DIELECTRIC LAYER(S) AND CORRESPONDING METHOD

This invention relates to a coated article including a substrate (e.g., glass substrate) which supports a coating thereon, wherein the coating includes at least one layer of or including $SbO_xN_y$. This layer is desirable for blocking (reflection and/or absorption) of at least some ultraviolet (UV) radiation. In certain example embodiments of this invention, the layer of $SbO_xN_y$ may be used as a dielectric layer in a low-E (low-emissivity) coating, and may improve UV-blocking capability of such a low-E coating. In certain example embodiments of this invention, $ZnO_xN_y$ and/or $Sb_{1-z}Zn_zO_xN_y$ may be used instead of $SbO_xN_y$ as a UV-blocking material/layer. Coated articles according to certain example embodiments of this invention may or may not be heat treated (e.g., thermally tempered, heat bent and/or heat strengthened). Coated articles according to certain example embodiments of this invention may be used in the context of insulating glass (IG) window units, monolithic windows, other types of windows, picture frame glass, museum glass, antireflective coatings, or in any other suitable application.

BACKGROUND OF THE INVENTION

Coated articles are known in the art for use in window application such as insulating glass (IG) window units, vehicle windows, and/or the like. In certain situations, designers of coated articles often strive for a combination of high visible transmission, substantially neutral color, low emissivity (or emittance), and blockage of undesirable radiation such as infrared (IR) and/or ultraviolet (UV) radiation to prevent undesirable heating or damage to a building or vehicle interior, or the like. Moreover, in certain example non-limiting instances, it is desirable to heat treat (HT) such coated articles (e.g., thermally temper, heat bend, and/or heat strengthen). Such heat treating often involves exposing the coated articles to temperatures of at least about 580 degrees C., more typically at least about 600 or 625 degrees C. which can lead to undesirable damage to many coatings.

Heat resistant UV blocking coatings deposited by wet chemistry techniques are known in the art. Such UV blocking coatings deal with the use of cerium oxide as the UV blocking material. Cerium oxide is an efficient UV blocker. However, unfortunately, cerium oxide absorbs significant amounts of light in the visible range thereby decreasing visible transmission of coated articles in which it is used, especially when combined with titanium oxide. For this reason, the use of cerium oxide in coated articles for windows or the like is not very desirable in certain applications. Furthermore, because of their high refractive index (n), thin films of cerium oxide provided directly on glass substrates also exhibit undesired optical effects such as interference colour etc. In order to suppress these undesired optical effects, an inner layer of a lower index material may be used. In addition to the drawbacks associated with the optical performance of cerium oxide based UV blocking coatings, fabrication of such coatings by vacuum deposition process is difficult and not attractive to commercial manufacturing applications.

In view of the above, it will be appreciated that there exists a need in the art for a heat resistant UV blocking coating that may be manufactured by high volume vacuum deposition processes such as sputtering. In certain example instances, it would also be desirable to provide UV blocking coatings that are heat resistant and are capable of achieving enhanced optical performance through thin film designs.

BRIEF SUMMARY OF EXAMPLE EMBODIMENTS OF THE INVENTION

Certain example embodiments of this invention relate to a coated article including a substrate (e.g., glass substrate) which supports a coating thereon, wherein the coating includes at least one layer of or including $SbO_xN_y$. This $SbO_xN_y$ inclusive layer is desirable for blocking (reflection and/or absorption) of at least some ultraviolet (UV) radiation. In certain example embodiments of this invention, the layer of $SbO_xN_y$ may be used as a dielectric layer in a low-E (low-emissivity) coating, and may improve UV-blocking capability of such a low-E coating. Coated articles according to certain example embodiments of this invention may or may not be heat treated (e.g., thermally tempered, heat bent and/or heat strengthened). Coated articles according to certain example embodiments of this invention may be used in the context of insulating glass (IG) window units, monolithic windows, other types of windows, or in any other suitable application.

In certain example embodiments of this invention, there is provided an insulating glass (IG) window unit comprising: first and second glass substrates, and a gap provided between the first and second glass substrates; a UV blocking coating provided on a surface of the first glass substrate closest to the gap; a low-E coating provided on a surface of the second glass substrate closest to the gap, the low-E coating including at least one infrared (IR) reflecting layer sandwiched between at least first and second dielectric layers; and wherein the UV blocking coating comprises at least one layer comprising $SbO_xN_y$, where values x and y represent stoichiometric and sub-stoichiometric forms, and for example x may be from about 1 to 3 (more preferably from about 1.5 to 2.5), and y may be from about 0 to 0.5 (more preferably from about 0 to 0.4, still more preferably from about 0 to 0.3, and possibly from about 0.05 to 0.3).

In other example embodiments of this invention, there is provided a coated article comprising: a glass substrate supporting a low-E coating, the low-E coating comprising at least one infrared (IR) reflecting layer comprising silver that is sandwiched between at least first and second dielectric layers, and wherein at least one of the first and second dielectric layers comprises antimony oxynitride.

In still further example embodiments of this invention, there is provided an insulating glass (IG) window unit comprising: first and second glass substrates, and a gap provided between the first and second glass substrates; a UV blocking coating provided on a surface of the first glass substrate closest to the gap; a low-E coating provided on a surface of the second glass substrate closest to the gap, the low-E coating including at least one infrared (IR) reflecting layer sandwiched between at least first and second dielectric layers; and wherein the UV blocking coating comprises at least one layer comprising $ZnO_xN_y$ and/or $Sb_{1-z}Zn_zO_xN_y$ (again, x may be from about 1 to 3, more preferably from about 1.5 to 2.5; y may be from about 0 to 0.5, more preferably from about 0 to 0.4, even more preferably from about 0 to 0.3, and possibly from about 0.05 to 0.3; and z may be from 0 to 1, possibly from 0.05 to 0.95, still further possibly from about 0.1 to 0.9, and possibly from about 0.25 to 0.75).

In other example embodiments of this invention there is provided a method of making an IG window unit, the method comprising: providing first and second glass substrates; sputter-depositing a UV blocking coating on a surface of the first glass substrate; sputter-depositing a low-E coating on a surface of the second glass substrate, the low-E coating including at least one infrared (IR) reflecting layer sandwiched between at least first and second dielectric layers; wherein the UV blocking coating comprises at least one layer comprising $SbO_xN_y$, $Zn_xO_yN_z$ and/or $Sb_{1-z}Zn_zO_xN_y$, and coupling the first and second substrates in making the IG window unit.

DETAILED DESCRIPTION OF EXAMPLES OF THE INVENTION

Figure 1:
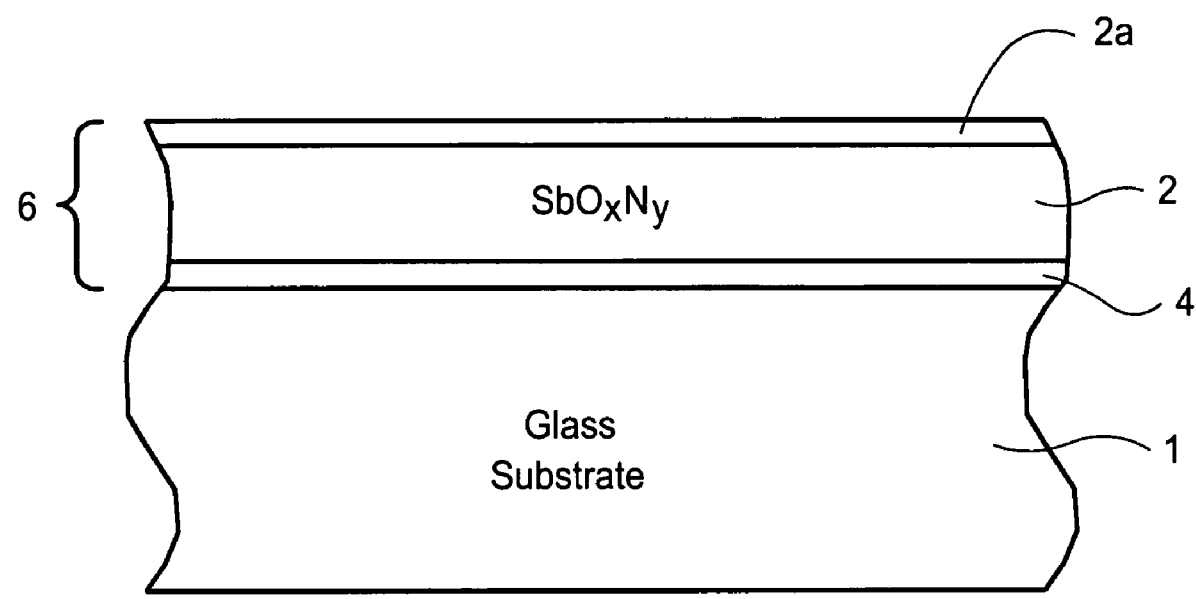
FIG. 1 is a cross sectional view of a coated article according to an example embodiment of this invention.

Referring now more particularly to the accompanying drawings in which like reference numerals indicate like parts throughout the several views.

Figure 2:
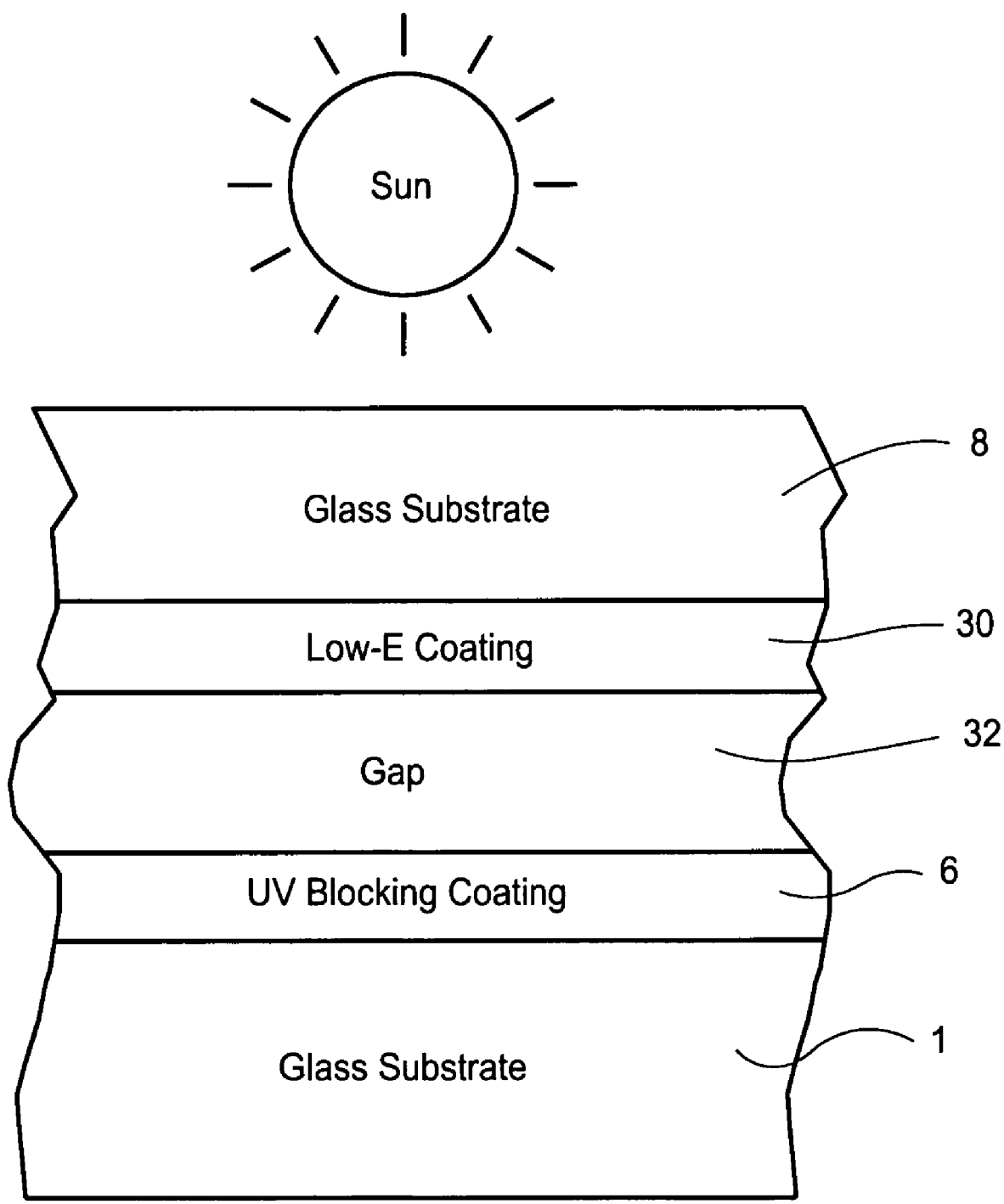
FIG. 2 is a cross sectional view of an IG window unit according to an example embodiment of this invention.
Figure 6:
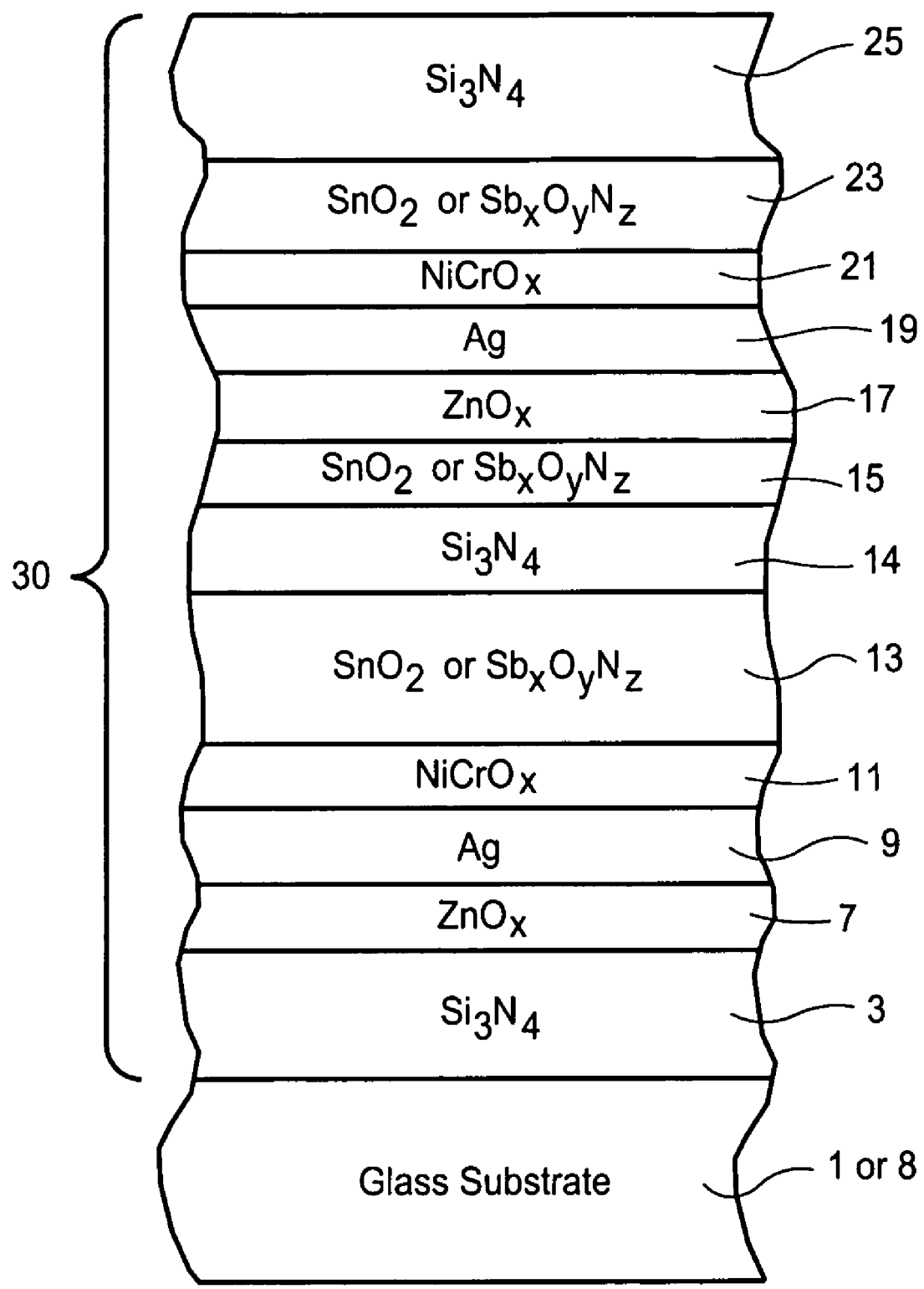
FIG. 6 is a cross section view of a coated article according to another example embodiment of this invention where a $SbO_xN_y$ inclusive layer(s) is used as a dielectric layer(s) of a low-E coating to enhance UV blocking properties of the low-E coating; again, the $SbO_xN_y$ may be replaced with $Sb_{1-z}Zn_zO_xN_y$ or the like in any embodiment of this invention.

Certain example embodiments of this invention relate to a coated article including a substrate (e.g., glass substrate) which supports a coating thereon, wherein the coating includes at least one layer of or including $SbO_xN_y$ (e.g., see layers 2, 13 15 and 23 in the accompanying FIGS. 1, 2 and 6). This $SbO_xN_y$ inclusive layer(s) is desirable for blocking (reflection and/or absorption) of at least some ultraviolet (UV) radiation. In certain example embodiments of this invention, a layer of $SbO_xN_y$ may be used as a dielectric layer(s) in a low-E (low-emissivity) coating (e.g., see FIGS. 2 and 6), and may improve UV-blocking capability of such a low-E coating. Coated articles according to certain example embodiments of this invention may or may not be heat treated (e.g., thermally tempered, heat bent and/or heat strengthened). When heat treated (as the term is used herein), the coated article is typically exposed to a temperature(s) of at least about 580 degrees C., sometimes at least about 600 degrees C., and sometimes at least about 620 or 625 degrees C. Coated articles according to certain example embodiments of this invention may be used in the context of insulating glass (IG) window units, monolithic windows, other types of windows, or in any other suitable application.

According to certain example embodiments, coated articles (e.g., IG window units, monolithic window units, etc.) herein including one or more layers of $SbO_xN_y$ may have a UV transmission (Tuv) of no more than about 7%, more preferably no more than about 6%, even more preferably no more than about 5%, even more preferably no more than about 3%, and possibly no more than about 2%.

With respect to $SbO_xN_y$, in certain example embodiments of this invention: "x" may be from about 1 to 3, more preferably from about 1.5 to 2.5, and most preferably from about 1.6 to 2.2; "y" may be from about 0 to 0.5 (more preferably from about 0 to 0.4, still more preferably from about 0 to 0.3, and possibly from about 0.05 to 0.3, and another possible range for "y" is from 0 to 0.1). In certain embodiments of this invention, it is preferred that there is more oxygen than nitrogen in the $SbO_xN_y$ (e.g., and thus more oxygen gas than nitrogen gas may be used in the sputtering process) so as to maximize visible transmission. These amounts of oxygen, nitrogen and antimony have been found to be particularly useful with respect to achieving a combination of (a) high visible transmission, (b) good UV blocking, and (c) durability. While these stoichiometries are desired in certain example embodiments of this invention, it is possible for other stoichiometries to instead be used. Moreover, it is noted that layers of $SbO_xN_y$ herein may also be doped with other materials such as Zn or the like.

FIG. 1 is a cross sectional view of an example embodiment of this invention. In the FIG. 1 embodiment, the coated article includes a glass substrate 1 supporting a UV blocking coating 6 including layer 2 of or including $SbO_xN_y$, an optional undercoat 4, and an optional overcoat 2a. It is possible that undercoat 4 and/or overcoat 2a may not be provided in certain instances, so that only the layer 2 (with possibly one of layers 2a, 4) would be provided on the glass substrate in certain possible instances and the UV blocking coating may be made up of only layer 2. However, other layer(s) may also be provided below and/or above the $SbO_xN_y$ layer 2 shown in the FIG. 1 embodiment. In certain example embodiments of this invention, a thin film of $SbO_xN_y$ 2 may be fabricated by sputtering techniques using Sb metallic or SbOx ceramic targets. Optical properties of the $SbO_xN_y$ may be adjusted by changing x and y values in the $SbO_xN_y$ matrix by varying partial pressures of oxygen and nitrogen used during the vacuum sputtering deposition process. In certain example embodiments of this invention, the $SbO_xN_y$ layer 2 has significant absorption in the UV region at wavelengths shorter than about 380 nm, and the absorption in the visible (e.g., 380-780 nm) is not significant, thereby permitting a combination of high visible transmission, substantially neutral color, and low UV transmission to be realized. Moreover, it has been found that coatings according to certain example embodiments of this invention are resistant to temperatures exceeding 600° C. without significant degradation of UV absorption, visible transmission, and/or color neutrality, and thus are suitable for high temperature processes such as tempering, heat bending, and/or heat strengthening of glass substrates.

In certain example embodiments, UV absorption improves after heat treatment. For instance, it has been found in certain example embodiments that heat treatment (e.g., thermal tempering) causes the UV absorption to increase so that more UV is blocked after HT compared to before HT. Additionally, because the absorption in visible region is fairly insignificant for the $SbO_xN_y$ in certain example embodiments of this invention, such embodiments are desirable for aesthetic applications and also the process of design and fabrication of optical coatings becomes relatively easier.

While the SbO$_x$N$_y$ layer 2 may optionally be provided directly on and contacting the glass substrate 1, one or more underlayer(s) or undercoat 4 may be provided under the layer 2 so as to be located between the layer of SbO$_x$N$_y$ 2 and the glass substrate 1 as shown in FIG. 1. In such instances, the UV blocking coating 6 would include both the layers 2 and 4, and possibly an overcoat. It has been found that thin film designs comprising SbO$_x$N$_y$ 2 utilizing such an undercoat 4 can reduce interference effects due to difference in refractive indices of layer 2 compared to the glass substrate 1. Thin film designs incorporating an overcoating (i.e., over the SbO$_x$N$_y$ layer 2) have also been developed to control the ratio of transmission to reflection, such as enhance transmission in visible region while suppressing reflection which is undesirable in certain applications such as window glass. In certain example embodiments of this invention, one or both of the undercoat 4 and/or overcoat 2a may be designed so as to have a refractive index (n) of from about 1.55 to 1.9, more preferably from about 1.6 to 1.85. Example materials for the undercoat 4 and/or overcoat 2a include silicon oxide, silicon oxynitride, or a mixture of silicon oxide and some other material such as antimony oxide.

In certain example embodiments of this invention, the SbO$_x$N$_y$ inclusive layer 2 has a refractive index (n) (at 550 nm) of from about 1.8 to 2.2, more preferably from about 1.9 to 2.2, with an example being from about 1.95 to 2.15. Because such layers have an index close to tin oxide, zinc oxide, and silicon nitride, it is possible to replace dielectric layers of tin oxide, zinc oxide and/or silicon nitride in low-E coatings with antimony oxide or antimony oxynitride in certain example embodiments of this invention so as to enhance UV blocking properties.

For purposes of example only, certain examples have been made as follows.

EXAMPLE 1

Figure 3:
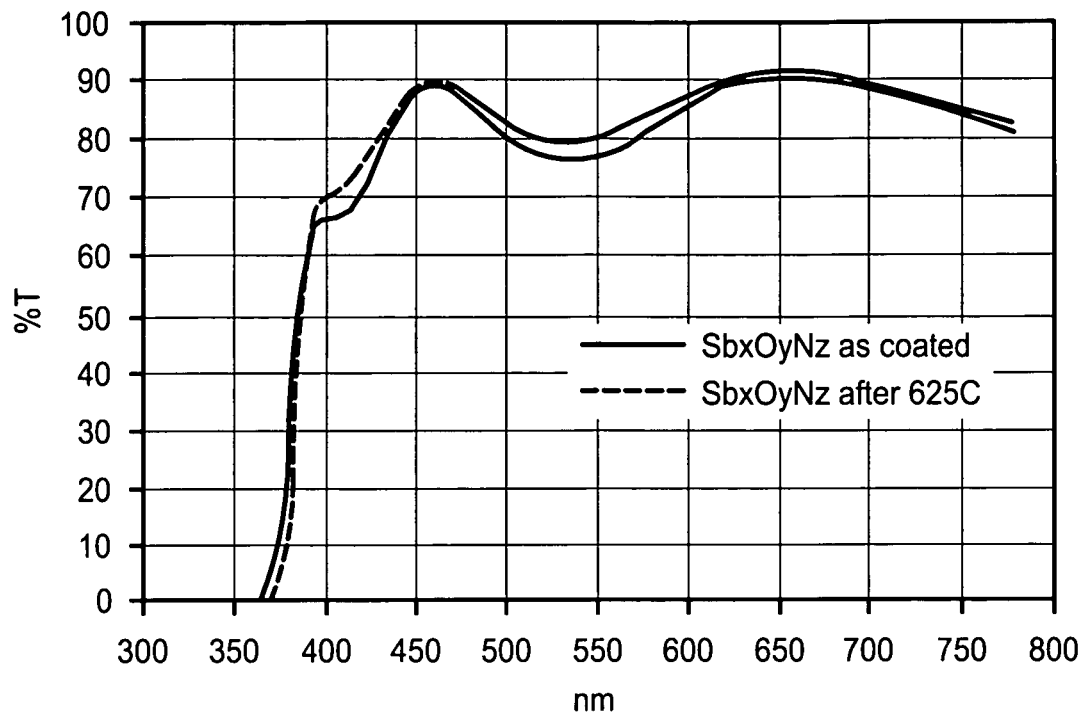
FIG. 3 is a transmission (% transmission) versus wavelength (nm) graph illustrating transmission characteristics of the coated article of Example 1, where y was approximately zero, before and after heat treatment (HT).

In Example 1, referring to FIG. 1, a 330 nm thick SbO$_x$N$_y$ layer 2 was sputter-deposited directly on and contacting a glass substrate 1 using antimony metallic target in an oxygen/argon mixed gas environment (i.e., nitrogen was not present in layer 2 in this example). No undercoat 4 was present in this example. After the antimony oxide layer 2 was sputter-deposited on the glass substrate 1, the coated glass substrate was subjected to high temperature heat treatment by heating at about 625° C. for about four minutes. The spectral response and UV blocking efficiency as determined by % Tuv are shown in FIG. 3, comparing the same before and after the heat treatment (HT). Moreover, the optical characteristics improved after the heat treatment, in that % Tuv (UV transmission) changed from about 6.7% to about 3.6% due to the HT thereby indicating the UV blocking improved due to the HT, and the % Tvis (visible transmission) increased from about 80% to about 82% thereby indicating that visible transmission increased due to the HT.

EXAMPLE 2

Figure 4:
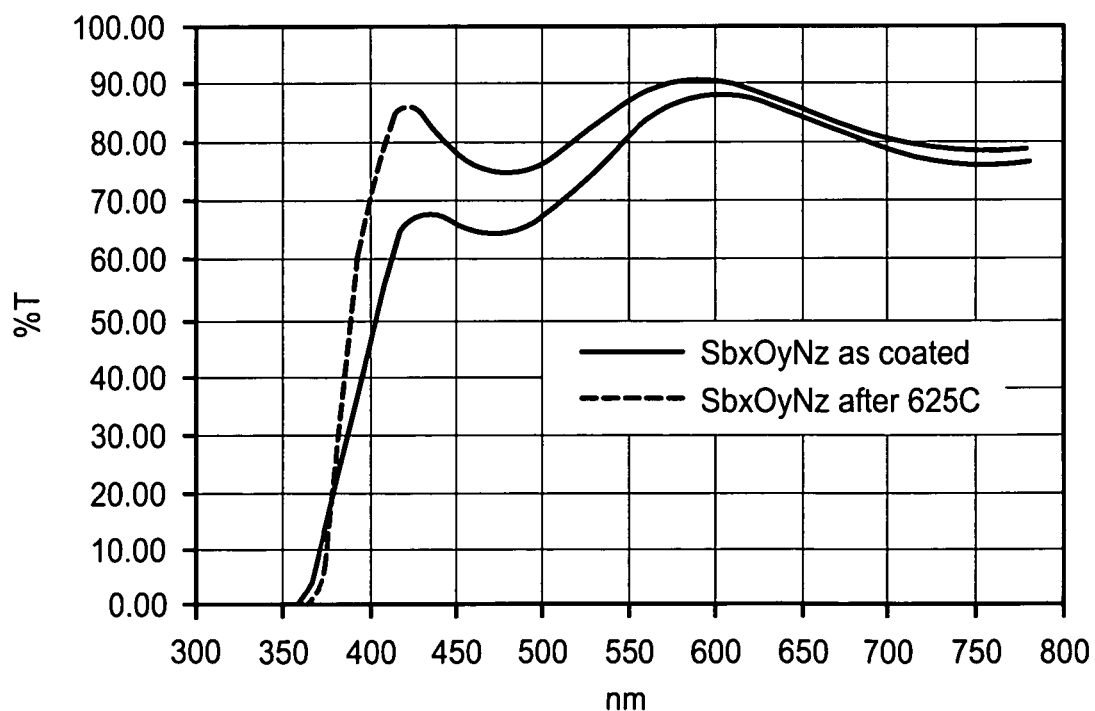
FIG. 4 is a transmission (% transmission) versus wavelength (nm) graph illustrating transmission characteristics of the coated article of Example 2 before and after heat treatment (HT).

In Example 2, again referring to FIG. 1, a 290 nm thick SbO$_x$N$_y$ layer 2 was deposited on a glass substrate 1 as in Example 1, except that part of the oxygen gas used in the sputtering process was replaced by nitrogen gas. The coated glass substrate was then subjected to high temperature heat treatment by heating at about 625° C. for about 4 min. The spectral response and UV blocking efficiency as determined by % Tuv are shown in FIG. 4 before and after the heat treatment. The optical characteristics improved after the heat treatment, in that % Tvis significantly increased from about 80% to about 86% due to the heat treatment, and % Tuv remained at about 5% before/after the heat treatment. It can be seen in FIG. 4 that visible transmission was higher (better) following the heat treatment.

EXAMPLE 3

Figure 5A:
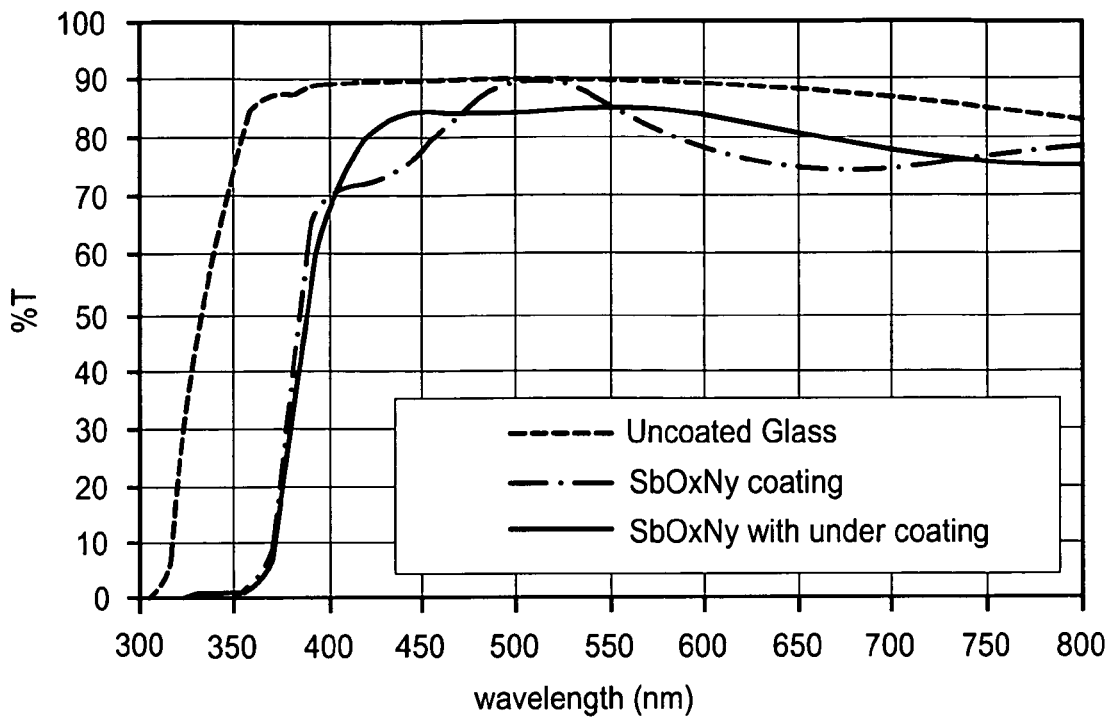
FIGS. 5a and 5b are transmission (% transmission) versus wavelength (nm) graphs illustrating transmission characteristics of the coated articles of Examples 3 and 4, respectively, with and without an undercoating provided between the glass and the $SbO_xN_y$.

In Example 3, a SbO$_x$N$_y$ layer 2 was formed as in Example 1, except that an undercoat 4 was also provided between the glass substrate 1 and the SbO$_x$N$_y$ layer 2 as shown in FIG. 1. The undercoat 4 was made of a mixture of antimony oxide and silicon oxide. This example demonstrates that depositing a 250 nm thick SbO$_x$N$_y$ layer 2 over such an undercoat having a thickness of 70 nm and refractive index of 1.74, reduces significantly any interference effects due to difference in refractive indices of the SbO$_x$N$_y$ and the glass substrate. FIG. 5a is a graph illustrating the characteristics of this example, where this example in the FIG. 5a graph is represented by the solid line for comparison against such a layer 2 being used without an undercoat. The advantages of the undercoat 4 are clear from FIG. 5a and this example. While the undercoat 4 is made of a mixture of antimony oxide and silicon oxide in this particular example, this invention is not so limited as other undercoat dielectric materials may instead be used such as silicon oxide, silicon oxynitride, and so forth.

EXAMPLE 4

Figure 5B:
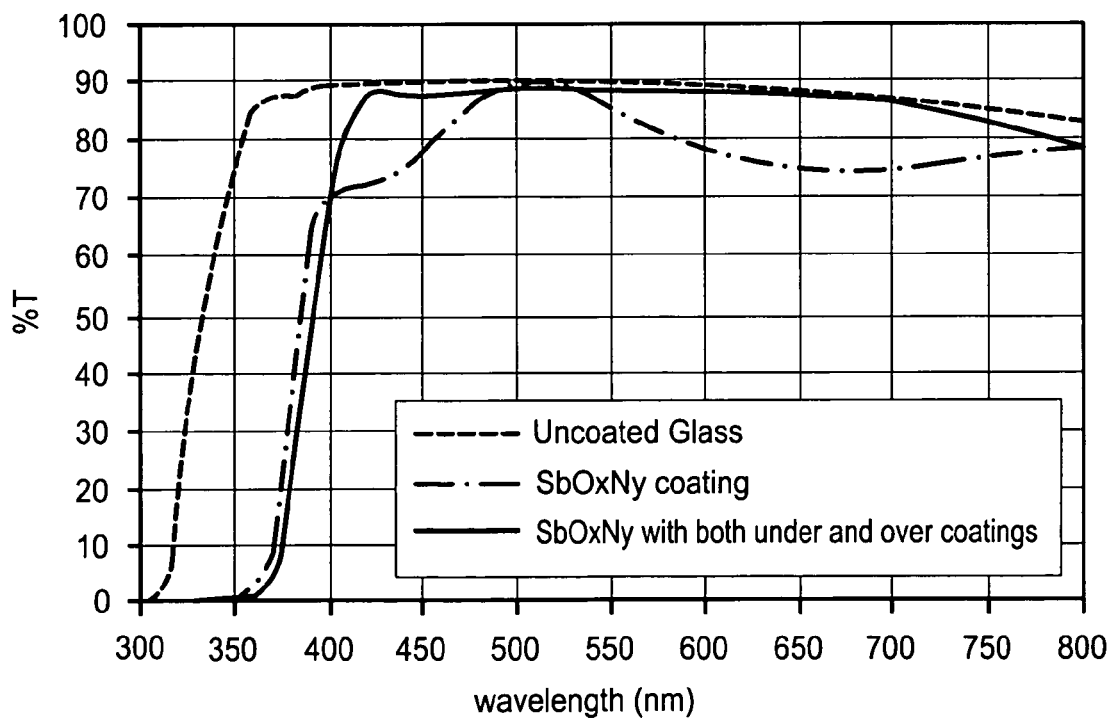

In Example 4, an alternate thin film optical design was developed using the experimental data obtained for the SbO$_x$N$_y$ described in Example 1. This example provides depositing a 77 nm thick and 1.79 refractive index (n) material over the thin film stack described in the Example 3 (i.e., this example had both an undercoat 4 and an overcoat 2a). The transmittance in the visible range can be controlled to a desired value while largely eliminating or reducing the interference effects. By judiciously selecting thickness and index (n) of the undercoat and/or the overcoat, the visible characteristics of the SbO$_x$N$_y$ inclusive coatings can be improved as shown in FIG. 5b. In this example, a visible transmission (CIE-C two degree observer) of 88.8%, an L* of about 95, an a* of about −0.5 and a b* of about 0.5 were realized. Thus, it will be appreciated that there can be achieved a nearly indistinguishable colour match to that of a commercial UV blocking coating based on organic materials or a bare glass without any coating.

FIG. 2 is a cross sectional view of an IG window unit according to an example embodiment of this invention. The IG window unit includes glass substrate 1 with the UV blocking coating 6 thereon (this UV blocking coating 6 may be any of the UV blocking coatings of Examples 1-4, or alternatively any of the UV blocking coatings described in connection with FIG. 1), and also includes another glass substrate 8 with a low-E coating 30 thereon. An air gap 32, which may or may not be filled with gas such as argon, is provided between the glass substrates as shown in FIG. 2. In this FIG. 2 embodiment, the primary purpose of the multi-layer low-E coating 30 is to block IR (infrared) radiation, whereas the primary purpose of the coating 6 is to block UV radiation. The low-E coating 30 may be any of the coatings described in any of U.S. Pat. Nos. 6,802,943, 6,730,352, 6,749,941, 6,686,050, 6,830,817, 6,787,005, 6,916,408, or 6,887,575, the disclosures of which are all hereby incorporated herein by reference, or alternatively may be any other suitable low-E coating (a low-E coating typically includes at least one IR reflecting layer of or including silver, gold or the like that is sandwiched between at least first and second dielectric layers). However, it is possible that in certain example embodiments of this invention, antimony oxide and/or antimony oxynitride may be provided in the low-E coating 30 so that the low-E coating can also block UV radiation, in which case the coating 6 may or may not be provided. In certain alternative embodiments, the UV blocking coating 6 may be on the interior surface of substrate 8 and the low-E coating 30 may be on the substrate 1, so that the respective positions of the coatings 6, 30 shown in FIG. 2 may be switched.

FIG. 6 is a cross sectional view of an example of a low-E coating which may be used as the low-E coating 30 in the FIG. 2 embodiment or any other embodiment of this invention. The coated article in FIG. 6 includes substrate 1 (e.g., clear, green, bronze, or blue-green glass substrate from about 1.0 to 10.0 mm thick, more preferably from about 1.0 mm to 7.0 mm thick), and low-E coating (or layer system) 30 provided on the substrate 1 either directly or indirectly. The coating (or layer system) 30 includes: dielectric silicon nitride or the like layer 3 which may be $Si_3N_4$ or any other suitable stoichiometry (such as Si-rich), first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), dielectric silicon nitride or the like layer 14 which may be $Si_3N_4$ or any other suitable stoichiometry (such as Si-rich), dielectric layer 15, second lower contact layer 17 which may be of zinc oxide or the like (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag, Au or the like). The aforesaid layers 3-25 make up low-E coating 30 which is provided on glass or plastic substrate 1. The layers and materials shown in the FIG. 6 embodiment are for purposes of example only and are not intended to be limiting, as other materials and/or layers may instead be used. Additionally, certain of these layers may be removed and/or other layers added to the layer stack.

Dielectric layer 3 may be of or include silicon nitride in certain example embodiments of this invention. This layer is provided for anti-reflective purposes, and preferably has an index of refraction (n) of from about 1.9 to 2.2. Layer 3 may be provided in direct contact with the glass substrate 1 in certain example embodiments of this invention, or alternatively other layer(s) may be provided between the substrate 1 and layer 3 in certain instances.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers 9 and/or 19 may, however, be slightly oxidized in certain embodiments of this invention.

Contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers allows durability to be improved. These contact layers may or may not be continuous in different embodiments of this invention across the entire IR reflecting layer.

Lower contact layers 7 and 17 in certain example embodiments of this invention are of or include zinc oxide (e.g., ZnO). The zinc oxide of layer(s) 7, 17 may contain other materials as well such as Al (e.g., to form $ZnAlO_x$). For example, in certain example embodiments of this invention, one or more of zinc oxide layers may be doped with from about 1 to 10% Al, more preferably from about 1 to 5% Al, and most preferably about 1 to 4% Al. The use of zinc oxide under the silver 9, 19 allows for an excellent quality of silver to be achieved.

Dielectric layers 13 and 15 may be of or include tin oxide in certain example embodiments of this invention. However, as with other layers herein, other materials may be used in different instances. Dielectric layer 23 may also be of or include tin oxide in certain example embodiments of this invention. However, layer 23 is optional and need not be provided in certain example embodiments of this invention. Dielectric layer 25, which may be an overcoat including one or more layers in certain example instances, may be of or include silicon nitride (e.g., $Si_3N_4$) or any other suitable material in certain example embodiments of this invention. Optionally, other layers may be provided above layer 25. For example, an overcoat layer of or including zirconium oxide (not shown) may be formed directly on top of the silicon nitride layer 25 in certain example embodiments of this invention. Silicon nitride layer 25 may be doped with Al or the like in certain example embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. Thus, the use of the word "on" herein is not limited to being in direct contact with.

Figure 7:
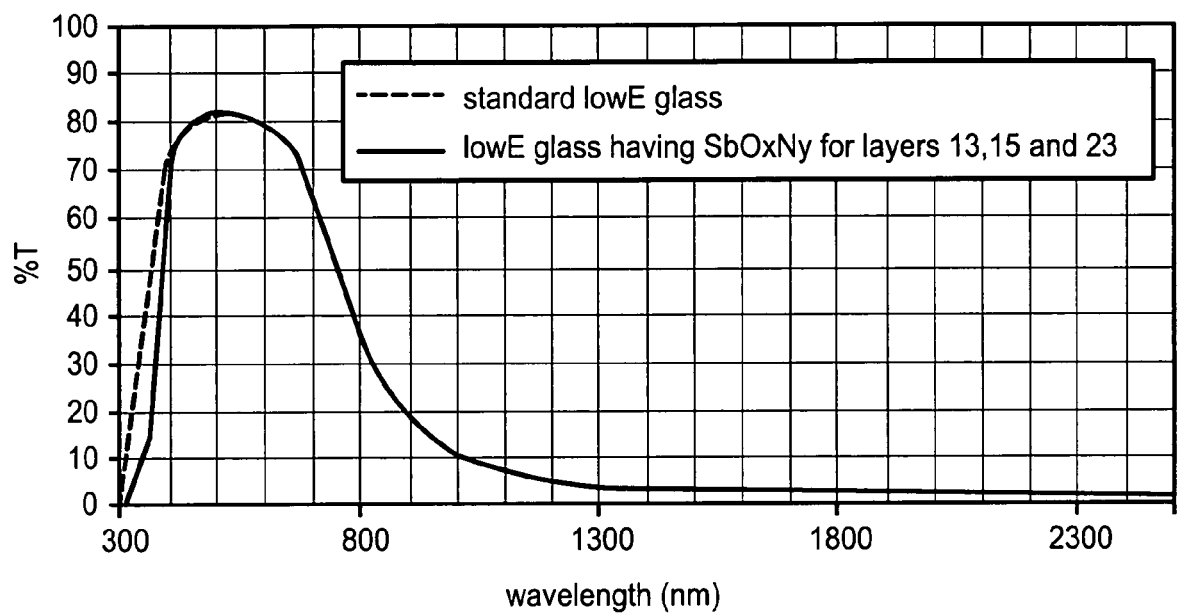
FIG. 7 is a transmission % versus wavelength (nm) graph illustrating transmission characteristics of an example coated article of FIG. 6, with and without $SbO_xN_y$ as dielectric layers in the coating.

In certain example embodiments of this invention, one, two or all three of layers 13, 15 and 23 may be of or include $SbO_xN_y$ as described above in any embodiment herein. The x and y values are as discussed above. Moreover, any of the Examples 1-4 may be used as one or more of layers 13, 15, and 23. The replacement of the tin oxide with the $SbO_xN_y$ in one or more of layers 13, 15, 23 in certain example embodiments of this invention is advantageous in that it permits the low-E coating 30 to block more UV radiation as shown in FIG. 7 which is advantageous in certain instances. When $SbO_xN_y$ is used in the low-E coating 30, and the coating is used in an IG unit as shown in FIG. 2, the additional UV blocking coating 6 is optional and may or may not be provided. Moreover, it is also possible to replace any of layers 3 and/or 14 with $SbO_xN_y$ in certain other example embodiments of this invention; this may be done instead of or in addition to the use of $SbO_xN_y$ in one or more of layers 13, 15 and 23.

While $SbO_xN_y$ is discussed as a UV blocking material above in connection with embodiments of this invention (e.g., see FIGS. 1-7), it is possible to use $ZnO_xN_y$ and/or $Sb_{1-z}Zn_zO_xN_y$ (again, x may be from about 1 to 3, more preferably from about 1.5 to 2.5; y may be from about 0 to 0.5, more preferably from about 0 to 0.4, even more preferably from about 0 to 0.3, and possibly from about 0.05 to 0.3; and z may be from 0 to 1, possibly from 0.05 to 0.95, still further possibly from about 0.1 to 0.9, and possibly from about 0.25 to 0.75) instead of or as a supplement to $SbO_xN_y$ in any embodiment discussed herein as an alternative UV blocking material. For instance, layer 2 in FIG. 1 may be of or include $ZnO_xN_y$ and/or $Sb_{1-z}Zn_zO_xN_y$ instead of $SbO_xN_y$ in certain example embodiments of this invention. As another example, $SbO_xN_y$ may be replaced with $ZnO_xN_y$ and/or $Sb_{1-z}Zn_zO_xN_y$ in any of Examples 1-4. As yet another example, $SbO_xN_y$ may be replaced with $ZnO_xN_y$ and/or $Sb_{1-z}Zn_zO_xN_y$ in one or more of layers 13, 15, 23, 3 and/or 14 in the FIG. 6 embodiment (or in the table below where example thicknesses are set forth). When $ZnO_xN_y$ and/or $Sb_{1-z}Zn_zO_xN_y$ is used in any embodiment of this invention is such a manner, the ratio of x:y is preferably from about 1.5 to 100, possibly from about 2 to 20, sometimes from about 2 to 10, and possibly from about 3 to 8. In certain instances it is possible for y to be zero.

While various thicknesses and materials may be used in layers in the FIG. 6 embodiment of this invention, example thicknesses and materials for the respective layers on the glass substrate 1 in the FIG. 6 embodiment are as follows, from the glass substrate outwardly:

EXAMPLE MATERIALS/THICKNESS; FIG. 6 EMBODIMENT

| Layer<br>Glass (1-10 mm thick) | Preferred<br>Range<br>(Å) | More<br>Preferred<br>(Å) | Example<br>(Å) |
| --- | --- | --- | --- |
| SiN (layer 3) | 10-450 Å | 50-250 Å | 201 Å |
| $ZnO_x$ (layer 7) | 10-300 Å | 40-150 Å | 106 Å |
| Ag (layer 9) | 50-250 Å | 60-120 Å | 100 Å |
| $NiCrO_x$ (layer 11) | 10-100 Å | 30-45 Å | 32 Å |
| $SnO_2$ or $SbO_xN_y$ (13) | 0-1,000 Å | 350-850 Å | 432 Å |
| SiN (layer 14) | 10-300 Å | 40-150 Å | 127 Å |
| $SnO_2$ or $SbO_xN_y$ (15) | 0-1,000 Å | 50-250 Å | 96 Å |
| $ZnO_x$ (layer 17) | 10-100 Å | 25-120 Å | 97 Å |
| Ag (layer 19) | 50-250 Å | 80-220 Å | 132 Å |
| $NiCrO_x$ (layer 21) | 10-100 Å | 30-55 Å | 32 Å |
| $SnO_2$ or $SbO_xN_y$ (23) | 0-750 Å | 50-300 Å | 121 Å |
| $Si_3N_4$ (layer 25) | 0-750 Å | 100-320 Å | 228 Å |

In certain example embodiments of this invention, coated articles herein may have the following optical and solar characteristics when provided in the context of an IG unit.

EXAMPLE OPTICAL CHARACTERISTICS (IG UNIT)

| Characteristic | General | More Preferred | Best |
| --- | --- | --- | --- |
| $T_{vis}$ (or TY)(Ill C, 2 deg.): | 50-80% | 60-85% | 65-75% |
| $R_s$ (ohms/square): | ≦3.0 | ≦2.5 | ≦2.0 |
| Tuv | <=7% | <=5% | <=3% |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An insulating glass (IG) window unit comprising:
   first and second glass substrates, and a gap provided between the first and second glass substrates;
   a UV blocking coating provided on a surface of the first glass substrate closest to the gap;
   a low-E coating provided on a surface of the second glass substrate closest to the gap, the low-E coating including at least one infrared (IR) reflecting layer sandwiched between at least first and second dielectric layers; and
   wherein the UV blocking coating comprises at least one layer comprising $SbO_xN_y$, where x is from about 1 to 3, and y is from about 0.05 to 0.3.

2. The IG window unit of claim 1, wherein x is from about 1.3 to 2.5, and y is from about 0 to 0.4.

3. The IG window unit of claim 1, wherein x is from about 1.5 to 2.5, and y is from about 0 to 0.3.

4. The IG window unit of claim 1, wherein x is from about 1.6 to 2.2.

5. The IG window unit of claim 1, wherein said layer comprising $SbO_xN_y$ has more oxygen than nitrogen.

6. The IG window unit of claim 1, wherein at least one of the dielectric layers of the low-E coating comprises $SbO_xN_y$ where x is from about 1 to 3, y is from about 0 to 0.5.

7. The IG window unit of claim 1, wherein the IG window unit has a visible transmission of at least about 60%, and a UV transmission of no more than about 7%.

8. The IG window unit of claim 1, wherein the IG window unit has a visible transmission of at least about 60%, and a UV transmission of no more than about 5%.

9. The IG window unit of claim 1, wherein the IG window unit has a visible transmission of at least about 60%, and a UV transmission of no more than about 3%.

10. The IG window unit of claim 1, wherein each of the first and second glass substrates are heat treated.

11. The IG window unit of claim 1, wherein each of the first and second glass substrates are thermally tempered.

12. The IG window unit of claim 1, wherein the UV blocking coating further comprises a dielectric layer having a refractive index (n) of from about 1.6 to 1.85 provided between the first glass substrate and the layer comprising $SbO_xN_y$.

13. The IG window unit of claim 12, wherein the dielectric layer provided between the first glass substrate and the layer comprising $SbO_xN_y$ comprises an oxide of silicon.

14. The IG window unit of claim 1, wherein the layer comprising $SbO_xN_y$ is sputter-deposited.

15. The IG window unit of claim 1, wherein the layer comprising $SbO_xN_y$ further comprises zinc.

16. An insulating glass (IG) window unit comprising:
   first and second glass substrates, and a gap provided between the first and second glass substrates;
   a UV blocking coating provided on a surface of the first glass substrate closest to the gap;
   a low-E coating provided on a surface of the second glass substrate closest to the gap, the low-E coating including at least one infrared (IR) reflecting layer sandwiched between at least first and second dielectric layers; and
   wherein the UV blocking coating comprises at least one layer comprising $ZnO_xN_y$, where x is from about 1 to 3, and y is from about 0.05 to 0.3.

17. The IG window unit of claim 16, wherein the layer comprising $ZnO_xN_y$ further comprises antimony, such that the layer includes $Sb_{1-z}Zn_zO_xN_y$, where x is from about 1 to 3, y is from about 0.05 to 0.3, and z is from 0.05 to 0.95.

* * * * *